UNITED STATES PATENT OFFICE 2,657,231

PROCESS FOR PRODUCING ALKYLENE-BIS-DITHIO-ALKYLENE AND -ARYLENE-DI-CARBOXYLIC ACIDS

Joseph Klarer and Helmut Timmler, Wuppertal-Elberfeld, Germany, assignors to Schenley Industries, Inc., New York, N. Y., a corporation of Delaware No Drawing. Application March 19, 1951, Serial No. 216,465. In Germany March 20, 1950

4 Claims. (Cl. 260—516)

This invention relates generally to processes for making organic chemical compounds useful in chemotherapy and, in a more particular sense, it is concerned with a novel method for the synthesis of certain dithioalkylene dicarboxylic acids, and salts of such acids, useful as cytostatic agents.

It is known that dithiolalkylene dicarboxylic acids may be obtained by reacting alkylene halides with mercapto carboxylic acids, for instance ethylene bromide may be reacted with thioglycollic acid to produce dithioethylene dicarboxylic acid of the formula:

HO.CO.CH₂S.CH₂CH₂.SCH₂CO.OH

The products obtained in this manner are impure, necessitating purification which presents difficulties, and the yields of products obtained by this prior art process are unsatisfactory.

One of the objects of this invention is to provide a simple process for the synthesis of dithioalkylene dicarboxylic acids which gives high yields of the desired products.

In accordance with this invention, a di-isothioureidoalkylene is reacted, in an aqueous alkaline reaction medium, with a halogen-substituted aliphatic or aromatic carboxylic acid salt and the salt of the desired dithioalkylene discarboxylic acid is thereafter recovered from the reaction mixture. The reaction may be represented, in general terms, as follows:

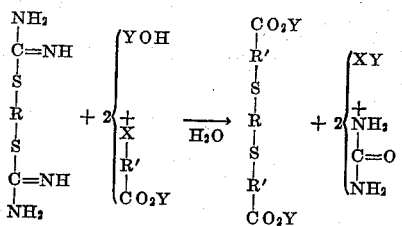

wherein R is a short-chain alkylene group comprising at most 3 carbon atoms, R' is a short-chain alkylene group or a monohomocyclic arylidene group, X is a halogen and Y is a strongly basic cation. It is possible that the foregoing reaction proceeds through an unisolated mercapto-intermediate of the form Y.S.R.S.Y.

It is preferred to use an aqueous solution of an alkali metal hydroxide as the reaction medium, such as, for instance, aqueous sodium hydroxide solution or aqueous potassium hydroxide solution. It is preferred to use simple mineral acid addition salts of the di-isothioureido alkylenes in the process, although, of course, the free bases may be used alternatively, if desired, and in any event they are liberated from the salts by the alkaline reaction medium. Chloro or bromo substituted carboxylic acid salts are preferred for use in the process and the salts may be produced in the reaction medium itself by merely adding the acid to the aqueous alkali solution. It will be understood that the primary reactants, the di-isothioureido-alkylene and the halogen-substituted carboxylic acid, are introduced into the reaction medium in the molar ratio of 1:2 and that for each mole of the former used, at least two moles of alkali hydroxide are provided in excess of the amount needed to liberate the free base or form the salt of the carboxylic acid. If desired the reaction can be conducted stepwise by initially reacting the di-isothioureidoalkylene with alkali to form the alkali metal derivative, then this product may be reacted with the halogen-substituted carboxylic acid or a salt thereof to yield the final dicarboxylic acid product or its salt from which the acid may be obtained upon treatment with acid.

The process of this invention is capable of general application in the synthesis of dithioalkylene dicarboxylic acids and permits the production, not only of known, but also of new compounds of this type. The products obtained according to the new process may be employed as therapeutics or dyestuffs, or may be used as intermediates in the synthesis of products of these types.

To faciltate a better understanding of the subject matter of this invention, certain specific examples herewith follow which are provided to illustrate how the principles of the invention may be given concrete embodiment but which are not to be construed as defining limitations of the invented process. In these examples the amounts of materials used are expressed in parts by weight for solids and by volume for liquids unless otherwise indicated.

Example 1

About 1000 parts of water and 120 parts of sodium hydroxide are stirred with 170 parts of di-isothioureido-ethylene hydrobromide at 80–100° for one hour and an alcoholic solution of 153 parts of β-bromo-propionic acid in 100 parts of alcohol is added at 20° C. Thereupon the mixture is heated on the water bath for about one hour, clarified with animal charcoal, the alcohol is removed by distillation and the reaction mixture is acidified with hydrochloric acid. The precipitated crude product, sym-ethylene di-(β-thio-propionic acid), is recrystallized from water, and is found to have a melting point of 148° C.

Example 2

About 34 parts of di-isothioureido-ethylene hydrobromide are introduced into a solution of 30 parts of sodium hydroxide in 100 parts of water, and 30 parts of monochloroacetic acid are introduced at a temperature of about 35° C. Thereupon the solution is stirred for another hour and mixed with hydrochloric acid while cooling until the solution shows an acid reaction. The precipitated crude product, sym-ethylene-di(thioglycollic acid), is recrystallized from some water and melts at 108° C.

Example 3

Approximately 202 parts of 3-nitro-4-chlorobenzoic acid are stirred in 1000 parts of water containing 60 parts of sodium hydroxide and 170 parts of di-isothioureido ethylene hydrobromide at 80–90° C., and 60 parts of sodium hydroxide in 200 parts of water are slowly added. After three hours the reaction mixture is allowed to cool and the precipitated salt is removed, dissolved in hot water and the solution is acidified with hydrochloric acid. The ethylene-1,2-di-(1'-thio-2'-nitro-phenyl-4'-carboxylic acid) so produced melts at 240° C.

Example 4

About 1000 parts of water, 120 parts of sodium hydroxide and 170 parts of di-isothioureido-ethylene hydrobromide are heated at 80–100° C. for one hour. Thereupon 219 parts of benzylbromide-p-carboxylic acid are slowly added and the reaction mixture is heated on the water bath for a further hour. Ethylene-di-(1-thiobenzyl-4-carboxylic acid), melting above 280° C., is thus obtained.

Example 5

Approximately 100 parts of water and 12 parts of sodium hydroxide solution are stirred with 18 parts of diisothioureido trimethylene hydrobromide (prepared by reacting 1.3-dibromopropane and thiourea) at 80–90° C. for one hour and thereafter a solution of 10 parts of chloroacetic acid in 20 parts of water is added at 20°. The reaction is complete after heating one hour on a water bath. Thereupon the reaction mixture is mixed with hydrochloric acid until an acid reaction is obtained and the solution is extracted with ether. After evaporation of the ether the residue solidifies in crystals. The trimethylene-bis-(thioglycollic acid) thus obtained melts at 68° C.

Having thus described the subject matter of the present invention, what it is desired to secure by letters Patent of the United States is:

1. Process for making a chemical compound represented by the formula:

YO.CO.R'.S.R.S.R'.CO.OY wherein Y is a strongly basic cation, R is a short-chain alkylene group comprising at most 3 carbon atoms, R' is a radical chosen from the group consisting of short-chain alkylene and mono-homocyclic arylidene radicals, that comprises heating together an ω-bis-S-isothioureidoalkylene of the formula:

$H_2N.C(:NH).S.R.S.C(:NH).NH_2$ and a compound of the formula:

X.R'.COOY wherein X is a halogen, in an aqueous medium containing an excess of an alkali metal hydroxide, and recovering from the reaction mixture the desired reaction product of the formula first set forth above.

2. Process as defined in claim 1 wherein the substance of the formula: X.R'.COOY is 3-nitro-4-chloro-benzoic acid.

3. Process as defined in claim 1 wherein the substance of the formula: X.R'.COOY is benzylbromide-p-carboxylic acid.

4. Process that comprises reacting ω-bis-S-isothioureido-ethylene hydrobromide with monochloracetic acid in an aqueous alkaline reaction medium and recovering from the reaction medium sym-ethylene-bis-S-thioglycollic acid.

JOSEPH KLARER.
HELMUT TIMMLER.

References Cited in the file of this patent

UNITED STATES PATENTS

| Number | Name | Date |
| --- | --- | --- |
| 1,598,167 | Stocker et al. | Aug. 31, 1926 |
| 2,423,865 | White | July 15, 1947 |
| 2,539,428 | Jansen | Jan. 30, 1951 |
| 2,602,816 | Gregory et al. | July 8, 1952 |

FOREIGN PATENTS

| Number | Country | Date |
| --- | --- | --- |
| 361,306 | Great Britain | May 15, 1930 |

OTHER REFERENCES

Dixon et al.: J. Chem. Soc. (London), vol. 101, p. 2502 (1912).

Ray et al.: J. Chem. Soc. (London), vol. 105, pp. 2159–61 (1914).

Reuterskiold: Chem. Abstracts, vol. 34, p. 2791 (1940).